UNITED STATES PATENT OFFICE.

ARTHUR REGINALD ADAMS, OF SURREY, ENGLAND.

ELECTRIC BATTERY.

SPECIFICATION forming part of Letters Patent No. 618,635, dated January 31, 1899.

Application filed March 29, 1897. Serial No. 629,824. (No specimens.)

*To all whom it may concern:*

Be it known that I, ARTHUR REGINALD ADAMS, a subject of the Queen of England, residing in Surrey, England, have invented certain new and useful Improvements in or Relating to Electric Batteries, of which the following is a specification.

This invention relates to electric batteries, and more particularly those known as "primary" batteries, and has for its object the composition of an exciting fluid for use in single-fluid batteries.

According to my invention instead of employing chemicals in the form of finished products for this purpose I make use of the crude salts, thus obtaining an efficient fluid at a much cheaper rate than when manufactured chemicals are employed. The chemicals which I mainly utilize comprise a chromium salt in solution treated by sulfuric acid and added to a solution of nitric acid or a nitrate in conjunction with mercury or a salt of mercury.

I may combine the above materials in various ways and proportions; but I will proceed to describe four examples of the manner in which I prefer to do this.

A.

1. Ten ounces of chromate of potash are dissolved by agitation in one hundred and twenty ounces of water preferably brought to a temperature not exceeding 100° Fahrenheit, and one hundred ounces of sulfuric acid are then cautiously added.

2. Twenty-five ounces of sodium nitrate dissolved in one hundred ounces of water at a temperature of 100° Fahrenheit are added to No. 1, the mixture being then stirred and allowed to cool.

3. Ten ounces of mercury dissolved in ten ounces of nitric acid are added to the mixture of Nos. 1 and 2 when they are cooled, the whole solution being then raised to a temperature of 150° Fahrenheit and well stirred to insure intimate mixing.

B.

1. Ten ounces of chromate of potash are dissolved in one hundred and twenty ounces of water, and fifty ounces of sulfuric acid are added.

2. Twenty-five ounces of sodium nitrate dissolved in one hundred ounces of water are mixed with No. 1.

3. Ten ounces of mercury boiled with sixty ounces of sulfuric acid until the mercury is resolved into mercuric sulfate are mixed with Nos. 1 and 2, as in Example A.

C.

1. Ten ounces of chromate of mercury are dissolved in forty ounces of water, and two hundred and twenty ounces of sulfuric acid are added.

2. Eighty ounces of sodium nitrate are dissolved in four hundred ounces of water. This solution is added to No. 1, and the two intimately mixed at a temperature not exceeding 100° Fahrenheit.

In this case only two solutions are necessary, since chromate of mercury is both a chromium and a mercurial salt.

D.

1. Ten ounces of chromate of soda are dissolved in one hundred and thirty ounces of water, and seventy-five ounces of sulfuric acid are added.

2. Twenty ounces of potassium nitrate are dissolved in fifty ounces of water and mixed with No. 1.

3. Ten ounces of perchlorid of mercury are dissolved in fifty ounces of boiling water. This is added to the mixed solutions Nos. 1 and 2 at a temperature of not less than 100° Fahrenheit, the whole being well stirred.

The above indicate my preferred alternative methods of composing the improved exciting fluid for electric batteries; but I wish it understood that I may find it convenient to depart from the exact proportions above mentioned without affecting my invention.

Having thus described my invention, what I claim therein as new, and desire to secure by Letters Patent, is—

1. The process of compounding an exciting fluid for electric batteries consisting in preparing first a chromate solution, adding sulfuric acid, then adding a solution of a nitrate of the alkali metals then adding a solution of a mercury salt and then mixing thoroughly at a temperature of about 150° Fahrenheit, substantially as described.

2. The process of compounding an exciting fluid for electric batteries consisting in preparing first a solution of chromate of potassium, adding sulfuric acid, then adding a solution of nitrate of sodium, and then adding a solution of nitrate of mercury and then mixing thoroughly at a temperature of about 150° Fahrenheit, substantially as described.

In witness whereof I have hereto set my hand in the presence of the two subscribing witnesses.

ARTHUR REGINALD ADAMS.

Witnesses:
   ALFRED S. ADAMS,
   WM. G. WILDE.